April 7, 1931.   A. Z. MAMPLE   1,799,855
COUPLING FOR PNEUMATIC TUBES, ETC
Filed Nov. 28, 1928
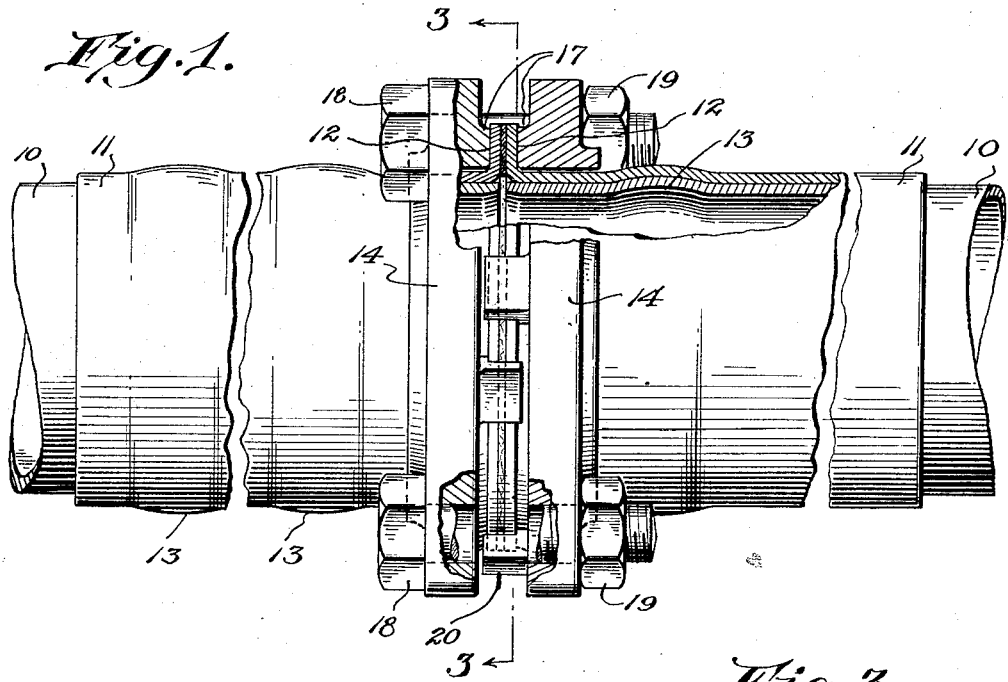
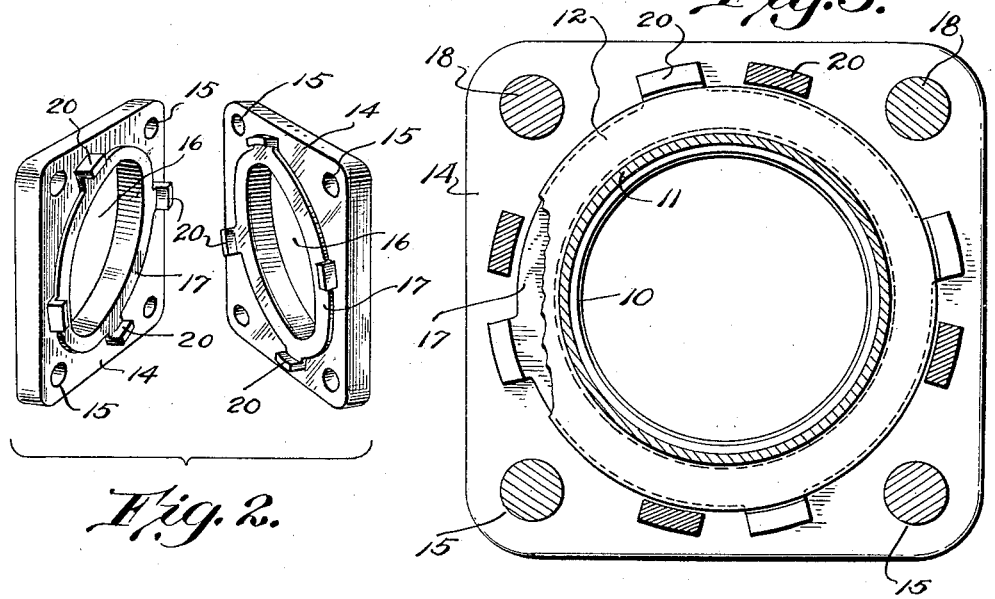
Inventor
A. Z. Mample
By Eugene C. Brown
Attorney Patented Apr. 7, 1931

1,799,855

UNITED STATES PATENT OFFICE

ADOLPH Z. MAMPLE, OF GLEN ROCK, NEW JERSEY, ASSIGNOR TO THE WESTERN UNION TELEGRAPH COMPANY, OF NEW YORK, N. Y., A CORPORATION OF NEW YORK

COUPLING FOR PNEUMATIC TUBES, ETC.

Application filed November 28, 1928. Serial No. 322,403.

This invention relates to pipe joints and has special reference to a flanged joint application to malleable metal pipes in the field.

In the application of flange joints to thin metal pipes in the field by spinning flanged thimbles on adjacent pipe ends it has generally been necessary heretofore to use mating members of unlike formation and in consequence to use care that like members are not applied to adjacent pipe ends. Also flanged joints for this character of pipe should permit visibility of the joint in application and after it is set up which is not possible with the usual type of joints for this purpose.

The principal objects of the present invention are, therefore, to provide an improved form of flange joint for malleable pipes which may be applied to the pipes in the shop or in the field by a simple spinning or pipe expanding operation; which will be visible both in application and after the pipes are joined; in which provision will be made for holding the various parts in proper concentric relation; and in which the mating parts will be of like form and size so that the necessity for use of two different forms of joint halves is eliminated, either end of a pipe section equipped with the improved joint may be fitted to an end of the adjacent section, and error and loss of time due to picking the proper joint half out of a pile of joints is eliminated.

With the above and other objects in view, as will be hereinafter apparent, the invention will now be particularly described in one preferred form and then specifically claimed, the construction being illustrated in the accompanying drawings, wherein:—

Figure 1 is a side elevation of the joint assembled.

Figure 2 is a disassembled perspective view of a pair of draw-up collars used herewith.

Figure 3 is an enlarged section on the line 3—3 of Figure 1.

In the invention as here disclosed there is shown a pair of pipe ends 10 on which are fitted thimbles 11 provided on their proximal ends with flanges 12. These thimbles are secured to the pipes by spinning or expanding the respective pipe ends and thimbles as at 13, a pipe or flue expander or roller being used for this purpose, the operation being performed preferably in the field since it permits accurate fitting of bends and variable length straight sections and also allows of more convenient transportation if the parts are transported in disassembled condition. However, the thimbles may be applied in the shop if found more desirable.

Before the thimbles are applied there is slipped on each thimble a draw-up collar which has preferably a substantially square body 14 provided at its corners with bolt openings 15. The confronting faces of these collars are provided around the central openings 16 with slightly raised rims 17 which bear against the outer faces of the thimble flanges 12. Through the bolt holes pass the usual bolts 18 provided with nuts 19. Positioning lugs 20 extend from the draw-up collars, being preferably thereto and these collars are of slightly less height than the distance between the draw-up collars when the joint is tight. The slugs 20 are positioned slightly outside of the raised portions 17 so that the edges of the flanges 12, which project slightly beyond the raised portions 17, are centered by these lugs. It is also to be particularly noticed that these lugs, which are preferably four in number, are displaced from diametral lines midway between adjacent bolt holes as can be clearly seen in Figure 3 so that the lugs of one collar 14 lie beside the lugs of the other collar symmetrically on opposite sides of these diametral lines and thus enabling both collars 14 to be identical in size and form. Furthermore, this arrangement of the lugs serves to hold the gasket 21 which is placed between the flanges 12 in central position and enables the gasket, the flanges 12 and the raised portions 17 to be observed in assembling the joint and afterwards to see whether the flanged faces are in proper alignment.

In this construction the thimbles will, of course, be of malleable metal sufficiently thin to enable the flue expander to properly act on the metal and the collars 14 will be rigid so as to take the strain of drawing the joint tight without distortion.

The pipes, with this joint arrangement, are connected by the bolts and nuts in the manner common to all flanged pipes.

I claim:—

1. A pipe coupling for connecting adjacent flanged ends of pipes, comprising a pair of identical members bolted together, each member having a polygonal body provided with bolt holes at the corners, and symmetrically disposed lugs arranged in opposite pairs displaced from diametral lines midway between adjacent bolt holes, whereby the lugs on opposite members lie beside each other in the assembled coupling, said lugs being adapted to overlie and hold in alignment the flanged ends of the pipes upon which they are used.

2. In a pipe coupling for connecting the ends of pipes, having a pair of thimbles fitting on said ends and flanges formed on the adjacent ends of said thimbles, means for aligning the bores of the pipes and securing the thimbles together, comprising polygonal draw-up collars loosely mounted on said thimbles to bear against said flanges, said draw-up collars being identical in construction and having centering lugs projecting from each collar, said lugs being symmetrically disposed in oppositely arranged pairs disposed on lines oblique to axes passing through the center of sides parallel to each other, said lugs extending over the periphery of said flanges to center said thimbles and align the bores of the pipes and means for drawing said collars together.

In testimony whereof I affix my signature.

ADOLPH Z. MAMPLE.